Jan. 11, 1949. R. B. BARNES 2,458,973
INFRARED SPECTROPHOTOMETRY
Filed Sept. 25, 1943 3 Sheets-Sheet 1

INVENTOR
ROBERT BOWLING BARNES,
BY
Robert Ames Norton
ATTORNEY

Jan. 11, 1949.   R. B. BARNES   2,458,973
INFRARED SPECTROPHOTOMETRY
Filed Sept. 25, 1943   3 Sheets-Sheet 2
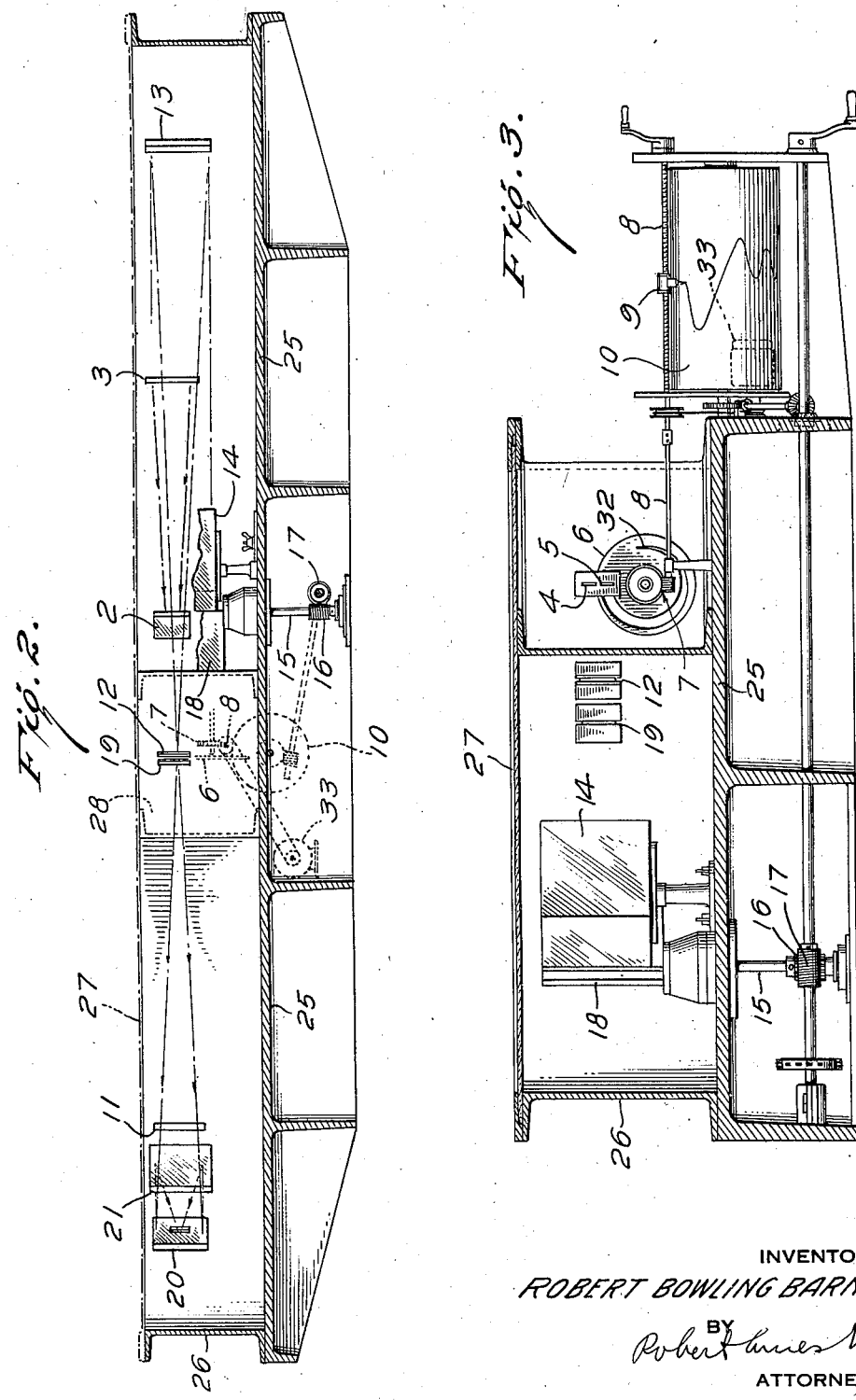
INVENTOR
ROBERT BOWLING BARNES,
BY
ATTORNEY Jan. 11, 1949.   R. B. BARNES   2,458,973
INFRARED SPECTROPHOTOMETRY
Filed Sept. 25, 1943   3 Sheets-Sheet 3
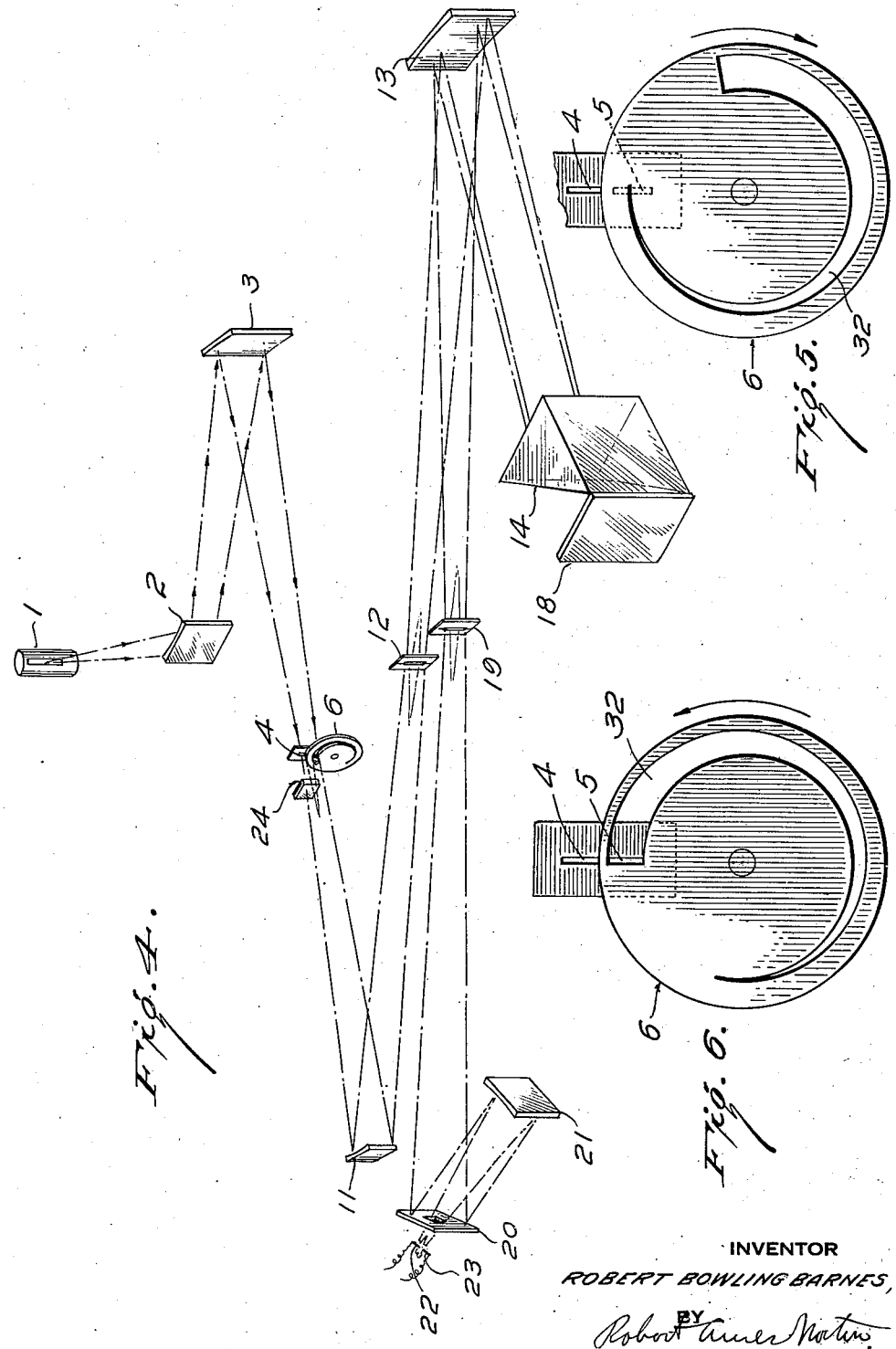
INVENTOR
ROBERT BOWLING BARNES,
BY
ATTORNEY Patented Jan. 11, 1949

2,458,973

UNITED STATES PATENT OFFICE 2,458,973

INFRARED SPECTROPHOTOMETRY

Robert B. Barnes, Stamford, Conn., assignor to American Cyanamid Company, New York, N. Y., a corporation of Maine Application September 25, 1943, Serial No. 503,769

7 Claims. (Cl. 250—43)

This invention relates to an improved apparatus for spectrophotometry and more particularly to an improved recording infrared spectrophotometer.

A number of visual spectrophotometers have been widely used which employ two beams, one of which passes through a sample and the other is a reference beam, photometry being effected by varying the intensity of one of the two beams, usually the reference beam, until a balance is obtained. The most highly developed spectrophotometers of this type for the visual range utilize polarized flickering beams, a typical apparatus being described in the patent to Pineo No. 2,107,836. Flickering beam spectrophotometers are tremendously effective in the visual spectrum and for some distance into the infrared and ultraviolet. They are, however, definitely limited to a range of radiant energy which will actuate photoelectric devices.

In the infrared it has heretofore been customary to use devices which measured the absorption of a sample by means of a single beam. Considerable difficulty arises due to the fact that the emission of any radiator of infrared energy varies greatly with frequency, and it is necessary to compare results with an emission curve for the particular radiator. This is not only time-consuming, but leads to inaccuracies due to changes in emission with time.

The present invention relates to a device which permits comparison beam spectrophotometry in the infrared or any other range of radiant energy where suitable detectors are available and which energy obeys optical laws and the reliability is comparable to that obtained with flickering beam visual spectrophotometers. Essentially, the present invention comprises an infrared or other radiator, means for producing a convergent parallel beam of considerable area and substantially uniform composition, and means for splitting the beam, preferably by placing two narrow slots separated by a narrow opaque section at a point of convergence of the beam. A sample is interposed into one beam, and a photometering device for changing the beam area is incorporated into the other beam, and then both beams are monochromated and caused to strike two separate radiation detectors such as thermocouples which can be used to indicate degree of unbalance or by suitable amplification to actuate recording means. Degree of unbalance can be measured or automatically recorded by the movement of the photometering device for varying the intensity of one of the beams. For automatic recorders operating on principles similar to those used with flickering beam visual spectrophotometers the output of the radiation detectors may be amplified and caused to actuate the intensity changing means in the beam, thus effecting photometry.

The present invention presents an important advantage, namely that the beam is split at a point where it has a finite area but uniform composition. Therefore, each of the two split beams will have the same composition regardless of local non-uniformity of emission from the surface of the radiant energy source. This is particularly important with infrared radiators which are usually of fairly large area and often a small portion of the area may be emitting at a different rate than other portions due to the impossibility of maintaining at all times absolutely uniform temperature and radiation conditions over a considerable radiating surface. The beam which is split is a composite of the radiation from all points of the radiator and, therefore, represents a composition which is substantially invariant throughout the whole of the finite area of the beam at the point of convergence where splitting is effected.

The present invention presents an extremely important advantage, particularly when dealing with measurements in the infrared. In the first place photometry is effected by bringing the output of the detectors in the two beams into balance and is, therefore, unaffected by changing of emission of the radiator. Thus all of the inaccuracies which result from changing emission of an infrared radiator with time and with wavelength are automatically eliminated. Rapidity and reliability of operation are comparable to flickering beam spectrophotometers without involving the necessity for radiation detectors which are capable of responding at flicker frequency. This removes the most serious obstacle to satisfactory infrared spectrophotometers which formerly required thermocouples or bolometers capable of responding with extreme rapidity so that flickering beams could be used. The present invention is suitable for any type of radiant energy detector such as a thermocouple which can be built in a rugged form capable of reliable operation at maximum sensitivity.

While it is an advantage that radiation detectors of extremely rapid response are not necessary, it is nevertheless desirable to use a radiation detector of moderate response speed, as a very slow detector will cause hunting unless the operation is greatly slowed. Thermocouples of moderate speed, for example of the order of one-quarter to one second, give excellent results in the present invention and, of course, their speed is of an entirely different order of magnitude than that required for response at useable flicker frequencies.

While the essence of the invention lies in the splitting of the beam into two adjacent beams, one of which passes through a sample, the other of which may be photometered, the other components of the apparatus may vary widely, and it is an advantage of the present invention that the essential feature thereof can be used with a wide variety of optical systems. A typical recording spectrophotometer embodying the present invention is described in the drawings without intending to limit the invention.

In the drawings,

Fig. 2 is a vertical section along the line 2—2 of Fig. 1;

Fig. 3 is a vertical section along the line 3—3 of Fig. 1;

Fig. 4 is a perspective of the optical paths of the means; and

Figs. 5 and 6 are detailed elevations of the photometering means showing it in its two extreme positions.

Figure 1:
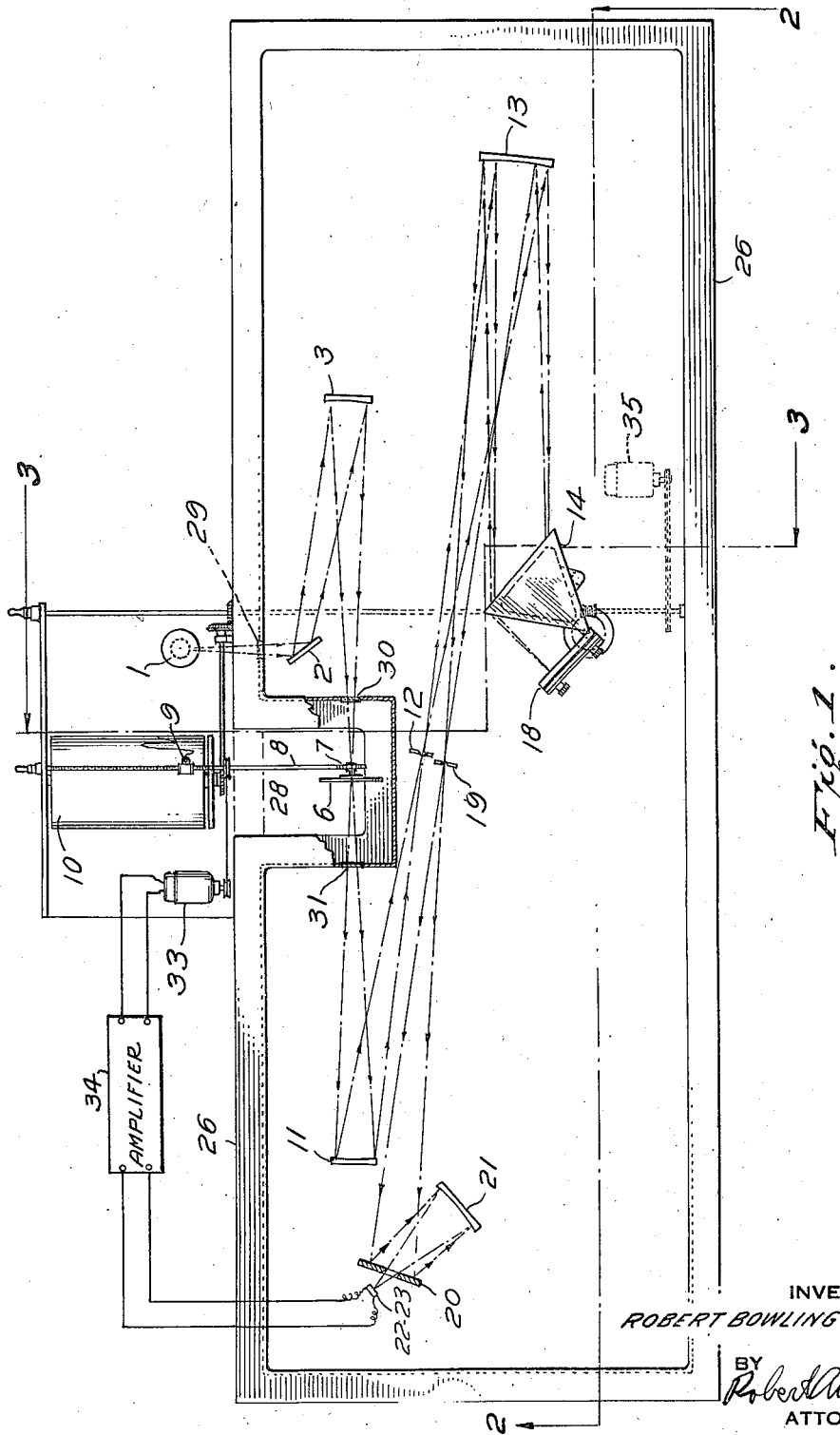
Fig. 1 is a plan view of a recording spectrophotometer.

The device shown in Fig. 1 contains a closed box or chamber formed of a ribbed bottom plate 25, sides 26, and a top 27, which may, if desired, be of glass or other transparent material. The chamber is preferably airtight so that it can be evacuated or moisture prevented from entrance so that optics of rock salt or similar soluble material may be used in order to permit the device to operate in the far infrared. The chamber is provided with a notch 28 which permits introduction of samples and photometering means in a radiant energy path outside of the airtight chamber.

An external infrared radiator 1, shown diagrammatically as an incandescent bar of refractory material, radiates a beam of light through a narrow window 29 into the airtight chamber. The beam strikes mirror 2, is reflected to a converging mirror 3, which focuses the beam in the form of a narrow line passing through window 30 in the notch 28. The upper portion of the beam passes through a slot 4 and then through a sample holder 24. The lower part of the beam passes through slot 5 separated from slot 4 by a narrow piece of metal. A suitable photometering element 6 is interposed in this lower beam. As shown (Figs. 5 and 6) it is a rotatable disk with a slot 32 of varying width. The disk is rotated by a worm and worm gear 7 from a shaft 8 which is driven by the motor 33 actuated by amplified current from the amplifier 34. The two beams passing through the slots 4 and 5 then reenter the airtight chamber through window 31 striking a converging mirror 11 which focuses them on a slit 12 from which they strike a converging mirror 13 which transforms them into parallel beams passing through the dispersing prism 14 onto the mirror 18 which is driven by the shaft 15 through worm gears 16 and 17 by a drive motor 35 which also rotates a recording drum 10 through suitable gearing. The shaft 8 moves a recording pen or stylus 9 across the drum.

The refracted dispersed beams again strike the mirror 13, are focussed on the slit 19, reflected from the mirror 20 to the curved mirror 21, and finally focussed onto separate thermocouples 22 and 23. The mirrors 11, 13, 18, 20 and 21, associated with the slits 1 and 19, and the dispensing prism 14 constitute a monochromator and rotation of the mirror 18 about its edge will cause successive bands of radiation to strike the thermocouples. As the drum 10 is turned by a drive connected with the mirror 18 it can be used to move a recording surface such as paper in accordance with the particular band of frequency of radiation striking the thermocouples. Output of the thermocouples is fed to the amplifier 34 (not shown) and amplified so as to drive the motor 33 in a direction to cause the beams to come into balance. The degree of movement of the photometering disk 6 is a measure of the unbalance and hence of absorption of the sample at the particular wavelength to which the monochromator is set. The operation of the photometer and recorder is similar to that which is encountered in flickering beam spectrophotometers, an amplifier being used, of course, which is capable of amplifying electrical output of the radiation detectors. In the case of thermocouples amplifiers of the type described in the copending application of Hood, Serial No. 453,002, filed July 31, 1942, now Patent No. 2,359,734, may be used.

The device illustrated in the drawings is a recording spectrophotometer but, of course, may be used for measuring absorption at a single set wavelength either by disconnecting the drive of the mirror 18 or by other suitable means.

Instead of a prism other dispersing means such as gratings may be used, but as the present invention permits operation in a vacuum or airtight compartment it is advantageous to use a large dispersing prism in order to gain in radiant energy, which is a problem in the infrared due to the fact that the amount of energy in any given band of frequency is small.

It is, of course, possible to use the present invention with radiators emitting visible or ultraviolet light and with detectors such as phototubes or photocells. The operation is precisely the same except that the characteristics of the amplifier 34 must, of course, match the output of the detectors. The present invention does not present as great advantages when used in visible or ultraviolet light over the highly efficient flickering beam spectrophotometers already available, as it does in the infrared region and, therefore, the use of the present invention in infrared spectrophotometry is preferred.

The preferred embodiment of the invention illustrated in the drawings shows the interposition of the beam splitting means between the energy radiator and the monochromating means. This is the most effective arrangement for practical operation because the splitting is effected at relatively high energy level. However, the essential operation of the invention does not require that a polychromatic beam be split. The same results may be obtained by interposing the splitting means and photometering means between the monochromator and energy detector. In such a case the monochromatic beam is split. The operation is the same but for practical purposes, particularly in the far infrared where the amount of energy is not great, it is preferable to effect beam splitting before monochromating.

I claim:

1. In a photometer which includes in optical alignment, a radiator of energy of frequencies sufficiently high to obey optical laws, a monochromating means and a plurality of radiation detecting systems, the detectors of which are of limited area too small to receive the whole energy of uncollimated beams, the improvement which comprises means for causing radiant energy from the radiator to converge in a beam and focus in a narrow line at the point of convergence thereof, said means being interposed in the optical system at a point between the radiator and the detectors, means for mechanically splitting said converged, narrow line beam into two separate beams, each of finite area, said splitting means being located at substantially the point of convergence of said beam, sample holding means positioned in one of the so split beams adjacent to said splitting means, means for causing each of the so split beams to strike separate radiant energy detectors and photometering means for determining the relative outputs of the detectors.

2. The improved photometer of claim 1 wherein said splitting means comprises an elongated slot having a narrow piece of opaque material across it at a point between its ends.

3. The improved photometer of claim 1 wherein said photometering means is positioned in the split beam which by-passes said sample and is capable of varying the area of said beam.

4. The improved photometer of claim 1 wherein said radiator is an infrared radiator.

5. In an improved photometer useful in comparison beam spectrophotometry in the infrared and other ranges of radiant energy which obey optical laws, the combination which comprises a radiator of such radiant energy, means for causing the radiant energy from said radiator to converge in a beam and focus in a narrow line at the point of convergence thereof, means for mechanically splitting the said converged narrow line beam at substantially the point of convergence thereof into two separate beams, each of finite area, means for causing each of the so separated beams to strike separate radiant energy detectors, sample holding means mounted in one of said split beams adjacent to said splitting means and photometering means mounted in the other split beam for varying the area thereof.

6. The improved photometer of claim 5 wherein said splitting means comprises an elongated slot having a narrow piece of opaque material across it at a point between its ends.

7. The improved photometer of claim 5 which includes monochromating means capable of monochromating infrared radiation, said monochromating means being interposed in the optical system at a point between the said splitting means and the detectors.

ROBERT B. BARNES.

REFERENCES CITED

The following references are of record in the file of this patent:

UNITED STATES PATENTS

| Number | Name | Date |
|---|---|---|
| 1,894,132 | Stone | Jan. 10, 1933 |
| 2,065,953 | Twyman et al. | Dec. 29, 1936 |
| 2,123,573 | McFarlan | July 12, 1938 |
| 2,269,674 | Liddel | Jan. 13, 1942 |
| 2,314,800 | Pineo | Mar. 23, 1943 |
| 2,328,293 | Pineo | Aug. 31, 1943 |